(12) United States Patent
Graf et al.

(10) Patent No.: US 6,641,202 B2
(45) Date of Patent: Nov. 4, 2003

(54) DRAINAGE ARRANGEMENT FOR A FOLDING ROOF OF A HARD-TOP VEHICLE

(75) Inventors: Thomas Graf, Sindelfingen (DE); Uwe Wacker, Schoenaich (DE)

(73) Assignee: DaimlerChrysler AG, Stuttgart (DE)

( * ) Notice: Subject to any disclaimer, the term of this patent is extended or adjusted under 35 U.S.C. 154(b) by 0 days.

(21) Appl. No.: 10/206,796

(22) Filed: Jul. 29, 2002

(65) Prior Publication Data

US 2003/0025351 A1 Feb. 6, 2003

(30) Foreign Application Priority Data

Jul. 30, 2001 (DE) .......................... 101 37 031

(51) Int. Cl.[7] .......................... B60J 10/10; B60J 10/12; B60J 7/12; B60J 1/18
(52) U.S. Cl. .......................... 296/107.04; 296/107.07; 296/107.17; 296/154; 296/146.14
(58) Field of Search .......................... 296/108, 146.1, 296/152, 154, 146.14, 79, 93, 107.04, 107.07, 107.16, 107.17

(56) References Cited

U.S. PATENT DOCUMENTS

| 5,527,081 | A | | 6/1996 | Rausch et al. | |
|---|---|---|---|---|---|
| 5,961,174 | A | | 10/1999 | Gold | |
| 6,030,022 | A | * | 2/2000 | Bormann et al. | 296/107.04 |
| 6,145,909 | A | | 11/2000 | Staley et al. | |
| 6,443,517 | B1 | * | 9/2002 | Just et al. | 296/107.16 |
| 6,443,519 | B1 | * | 9/2002 | Betzl | 296/154 |
| 6,497,446 | B2 | * | 12/2002 | Obendiek | 296/107.17 |
| 2002/0030380 | A1 | * | 3/2002 | Rothe et al. | 296/107.07 |

FOREIGN PATENT DOCUMENTS

| DE | 4017196 | 5/1991 | |
|---|---|---|---|
| DE | 4302547 | 3/1994 | |
| DE | 195 02 325 C2 | 1/1995 | |
| DE | 19502325 | 8/1996 | |
| DE | 197 51 660 C1 | 11/1997 | |
| JP | 6-199189 | * 7/1994 | 296/93 |

* cited by examiner

Primary Examiner—Dennis H. Pedder
Assistant Examiner—H. Gutman
(74) Attorney, Agent, or Firm—Crowell & Moring LLP

(57) ABSTRACT

In a drainage arrangement for a folding hard-top vehicle roof that can be moved into a storage position in the vehicle luggage compartment with the aid of pivotable C pillars, the rear window is pivotable relative to the C pillars (2). Associated with the bottom edge of the rear window is a seal which has a water-guiding channel formed therein. The channel opens in the area of the C pillars into a collecting trough (12), which in turn is connected by a flexible hose (13) to a moisture space of one of the vehicle side windows.

8 Claims, 2 Drawing Sheets

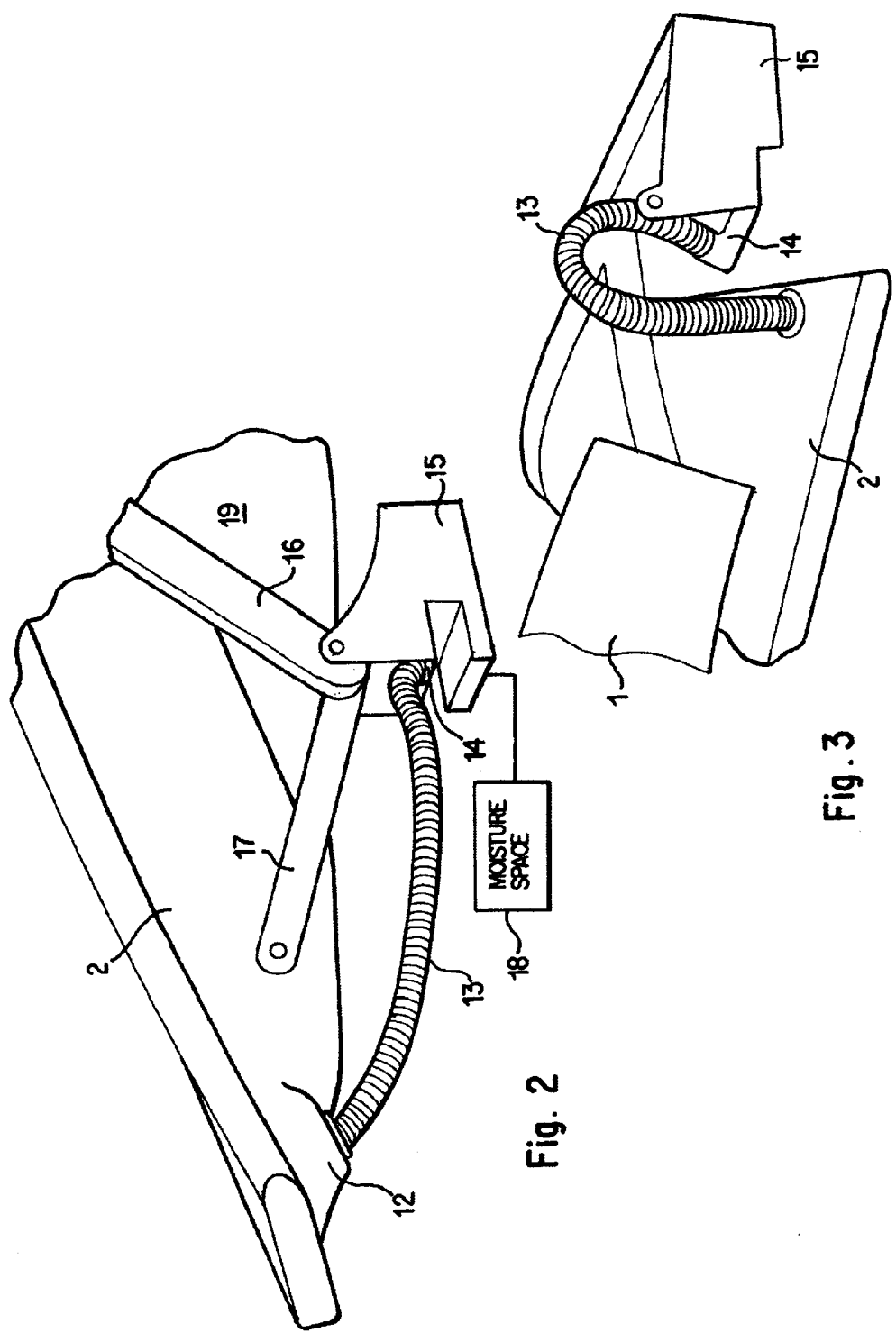

DRAINAGE ARRANGEMENT FOR A FOLDING ROOF OF A HARD-TOP VEHICLE

BACKGROUND AND SUMMARY OF THE INVENTION

The invention relates to a drainage arrangement for a folding roof of a hard-top vehicle having a front roof part that can be moved into a storage position within a rear luggage compartment with the aid of lateral and pivotable roof pillars, and a rear window that can be pivoted relative to the roof pillars during transfer to the storage position. A water-guiding channel is provided on the lower side of the rear window, and in the closed position of the roof, the channel extends underneath the luggage-compartment cover and is connected to a flexible hose for water drainage.

An apparatus for storing the roof structure of a hard-top vehicle is disclosed in German patent document DE 197 51 660 C1. This roof arrangement addresses the proposition that too much space is wasted in the rear area, especially in the luggage compartment, if the front roof part and the rear roof part are pivoted about a main center of rotation in such a way that they are deposited in the rear area with their curvatures facing in opposite directions. The rear window has therefore been decoupled from the rear roof part and provided with its own frame. The frame and the rear window are then pivoted independently of the front roof part and the roof pillars (C pillars) about a center of rotation on the C pillars in such a way that they can be deposited in the rear area in the same sense as or in the same direction of curvature relative to the front roof part. As a result, the deposited roof takes up significantly less of the volume of the luggage compartment. However, German patent document DE 197 51 660 C1 does not address the question of how adequate sealing and drainage is to be accomplished in such a roof arrangement.

German patent document DE 195 02 325 C2, on the other hand, discloses a drainage arrangement of the generic type stated at the outset. There, the rear window is held by means of a frame, which forms a water-guiding channel at the bottom edge of the rear window. This water-guiding channel is arranged and designed in such a way that, with the folding roof closed, it is below a water-guiding channel arranged on the lower edge region of the C pillars. At its base, this water-guiding channel associated with the C pillars is provided with a through opening, allowing water to pass into the rear window's water-guiding channel situated below it. In turn, the latter channel is provided with a drainage opening and a drainage hose leading to the wheel arch in the area of connection to the C pillar. A solution of this kind with a drainage hose on a water-guiding channel connected to the rear window cannot be implemented on a folding roof of the type such as disclosed in German patent document DE 197 51 660 C1, where the rear window and the roof pillars (C pillars) are deposited in the area of the luggage compartment with their curvatures facing in the same direction.

It is therefore an object of the present invention to provide a drainage arrangement for a folding roof of the type stated above which can is effective even when the vehicle has been parked in a slanting position, e.g., when it has been parked partially on the pavement.

This and other objects and advantages are achieved by the drainage arrangement according to the invention, in which the water-guiding channel is provided in a seal associated with the rear window and opens in the area of each of the roof pillars into a collecting trough that is part of the sealing system of the roof pillars (or that part of the rear roof that lies outside the rear window). The collecting trough is connected by the flexible hose to the moisture space of one of the vehicle side windows.

This configuration makes it possible to transfer water drained off from the roof into an area which is provided in a known manner, with a drainage space. The use of a flexible connecting hose, in particular one designed as a type of corrugated hose, offers the advantage that the hose can follow the movement of the lateral roof pillars without problems and thus effects the drainage of water from the lowest point of the roof, i.e., the point where the collecting trough is arranged. In the stored position of the roof, the hose can fold up without buckling, especially if it is designed as a corrugated hose, and therefore remains as a connecting piece to the moisture space of the side window and the drainage channel associated with this space, even in the folded-up stored position of the roof.

According to a feature of the invention, the water-guiding channel can be formed between two parallel sealing beads, which are in alignment with corresponding beads of a second seal associated with the bottom edge of the roof pillars or with the lateral parts of the rear roof that are formed by these.

In a further refinement, the beads of the two seals can adjoin one another by means of joints that are arranged offset relative to one another when viewed in the longitudinal direction of the respective seal. By virtue of this configuration in the lower rear area, where water flowing off accumulates due to the lack of a gradient, water that enters, for example, via the joint of the main seal, when the vehicle is being cleaned with a high-pressure cleaner, for example, can spread out uniformly in the water-guiding channel situated underneath, and then be drained off.

In this configuration, the joint of the bead situated closer to the rear window can project farther into the area of the roof pillar or rear roof than the joint of the second bead. The effect of this configuration is that the joint surface of the main seal on the first bead is not in the critical corner area. As a result, largely homogeneous sealing planes can be produced.

Finally, according to another feature of the invention, the joints can be cut obliquely, ensuring that they rest properly one on top of the other when the roof is closed and, moreover, can also be used to compensate for tolerances in the Y direction.

Other objects, advantages and novel features of the present invention will become apparent from the following detailed description of the invention when considered in conjunction with the accompanying drawings.

BRIEF DESCRIPTION OF THE DRAWINGS

FIG. 2 is a schematic perspective representation of the path of the drainage hose with the roof closed; and FIG. 3 shows the position of the drainage hose with the folding roof deposited in the rear area.

DETAILED DESCRIPTION OF THE INVENTION

Figure 1:
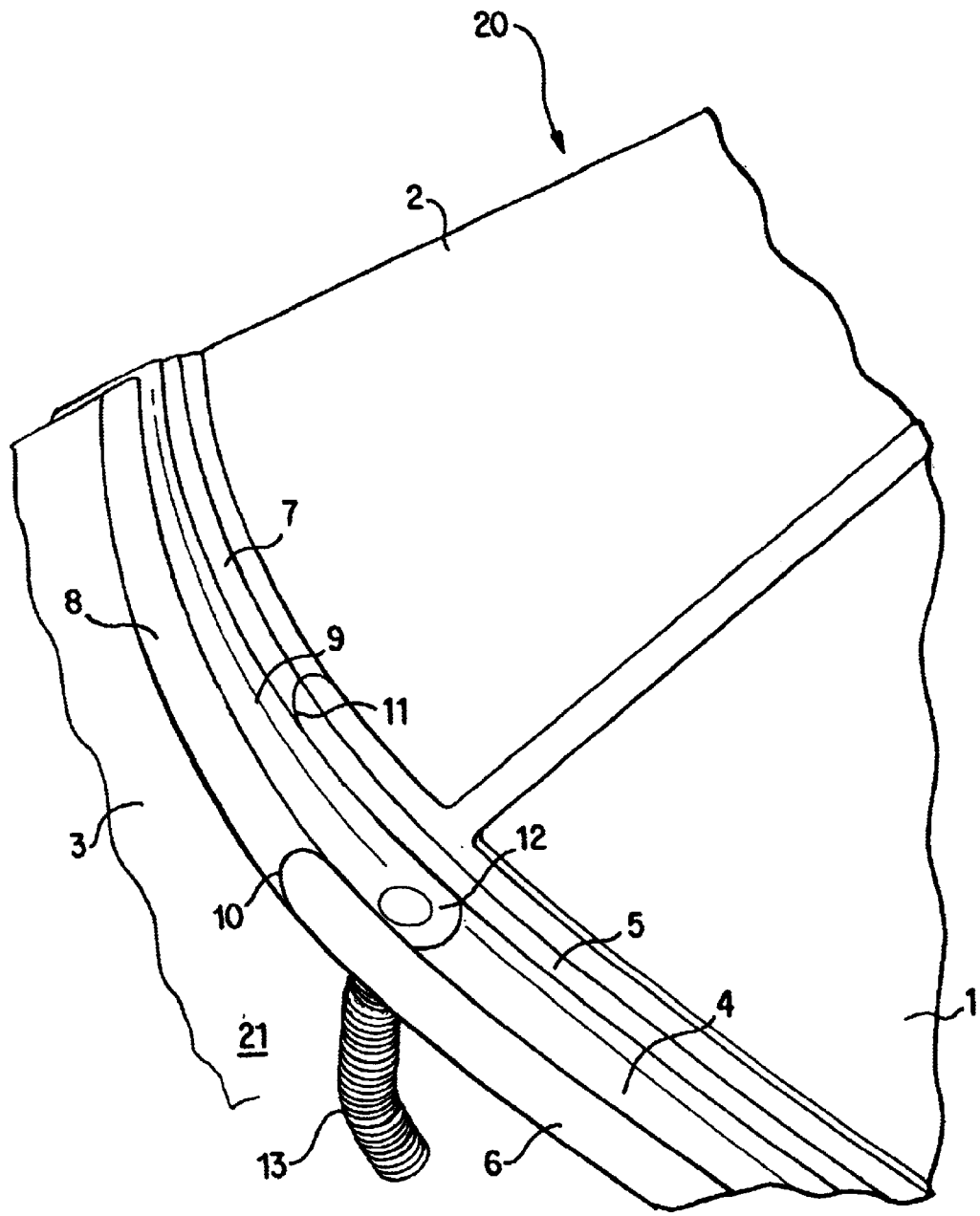
FIG. 1 is a schematic perspective partial view of a drainage arrangement in the region of the lower end edge of the rear window.

FIG. 1 shows a rearward portion of a folding roof for a hard-top vehicle which includes a rear window 1 that adjoins a pivotable roof pillar 2 (C pillar) in the lateral area. In turn, a rear luggage compartment cover 3 adjoins the roof pillar 2 and the rear window 1, overlapping the seal associated respectively with the roof pillar 2 and the rear window 1 in the condition shown (in which the folding roof occupies the closed position). In the case of a vehicle with a folding roof 20 in the form of a hard top that can be pivoted down, there is no drainage channel between the rear luggage compartment cover 3 and the roof parts. The rear window 1 is therefore assigned a water-guiding channel 4, which is situated between two sealing beads 5 and 6 extending approximately parallel to one another. From the rear window 1, sealing bead 5 projects farther into the area of the lateral roof pillar 2 than sealing bead 6.

The foot of the lateral roof part, which is formed by the roof pillar 2 and lies laterally outward of the rear window 1, is likewise assigned a seal, comprising two beads 7 and 8, between which there is a water-guiding channel 9. Sealing beads 5 and 7, on the one hand, and sealing beads 6 and 8, on the other hand, adjoin one another at joints 10 and 11, which are each cut obliquely, with the result that the end of bead 5 overlaps the end of bead 7 in the position illustrated. In the same way, the end of bead 6 overlaps the end of bead 8 at joint 10. As already indicated, in the area of joint 11, which is associated with the main seal, the two joints 10, 11 are arranged offset relative to one another in the longitudinal direction of the water-guiding channels 4 and 9 and the two sealing arrangements in which they are formed. Incoming water, which could pass through at this joint in a car wash or when the vehicle is cleaned with a high-pressure hose, for example, is therefore distributed in the water-guiding channel 9, which is bounded on the opposite side by the continuous bead 8. Both the water-guiding channels 4 and 9 are connected to a collecting trough 12, which is situated at the lowest point of the roof arrangement, in the area of the roof pillar (C pillar) in the exemplary embodiment. At the bottom, the collecting trough 12 opens into a connection stub, which is fitted with a corrugated hose 13. The latter leads out of the rear area of the roof, which does not have any drainage, in a manner which will be described later, to the moisture space 18 of one of the side windows 19, especially to the moisture space of the front side window.

This configuration therefore ensures that any water which accumulates in the rear area of the roof can be drained off even when the vehicle is parked in a slanting position, for example, and there would thus be no way for the water caught in the seal to flow off without the collecting trough 12 and the drainage hose 13. Such a collecting trough 12 and a drainage hose 13 are, of course, not only provided on the schematically illustrated left-hand side of the rear window 1 but also on its right-hand side in a similar way.

FIG. 2 is a view into the interior of the folding roof, and shows, schematically the roof pillar 2 with the collecting trough 12 and the drainage hose 13, which is connected to moisture space 18. In this position, in which the roof is closed, the drainage hose is stretched from the collecting trough 12 to a connection stub 14, which, in turn, is connected to the moisture space (not shown) of the front side window. In this arrangement, the drainage hose 13 opens approximately in the area of the folding roof in which the fixing base 15 for the actuating levers 16 and 17 provided for pivoting the roof is connected pivotally to the vehicle.

FIG. 3 shows the drainage hose 13 in a more or less compressed state which it takes on when the roof pillar 2 (which here also forms the remainder of the rear roof part extending laterally on both sides of the pivotable rear window 1) is in the stored position underneath the cover 3 of a rear luggage compartment or storage space 21.

Referring once again to FIG. 1, it can be seen that the luggage-compartment cover 3 covers the drainage channels 4 and 9 but that there remains a gap between it and the roof parts because it comes to rest only on the sealing beads 6 and 8. Water to be drained off in the manner described above enters the sealing arrangement through this gap, and is drained off from there via the hose 13.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Drainage arrangement for a folding hard-top vehicle roof that can be moved into a storage position within a vehicle rear luggage compartment via lateral and pivotable roof pillars, and a rear window that can be pivoted relative to the roof pillars during movement to the storage position, a water-guiding channel being provided at a bottom edge of the rear window, said channel, in a closed condition of the roof, extending underneath a luggage-compartment cover and being connected to a flexible hose for water drainage, wherein:

the water-guiding channel is formed in a first seal associated with the rear window;

the water guiding channel opens in an area adjacent each of the roof pillars, into a collecting trough that is part of a sealing system of the roof pillars or of a part of a rear roof portion that lies laterally outward of the rear window; and the collecting trough is connected by the flexible hose to a moisture space of a vehicle side window.

2. The drainage arrangement according to claim 1, wherein the flexible hose comprises a corrugated hose resistant to buckling.

3. The drainage arrangement according to claim 1, wherein:

the water-guiding channel is formed between a first pair of parallel sealing beads;

the beads of the first pair of sealing beads are in alignment with corresponding beads of a second pair of parallel sealing beads which form a second seal associated with the bottom edge of the roof pillars or with a lateral rear roof formed by the pillars.

4. The drainage arrangement according to claim 3, wherein the beads of the first and second seals adjoin one another by means of joints that are arranged offset relative to one another in a longitudinal direction of the seals.

5. The drainage arrangement according to claim 4, wherein one of said joints, which is between the beads situated closer to the rear window, projects farther into an area of the roof pillar than the other of said joints, which is between the beads situated farther from the rear window.

6. The drainage arrangement according to claim 4, wherein the joints are cut obliquely.

7. A drainage arrangement for a folding hard top vehicle roof that can be moved between a closed position and a storage position within a rear storage space via pivotable roof pillars situated laterally adjacent to a vehicle rear window, said drainage arrangement comprising:

a seal provided at a bottom edge of the rear window, said seal extending underneath a luggage compartment cover of the vehicle when the folding roof is in the closed position;

a water-guiding longitudinal channel formed in the seal and extending beneath the luggage compartment cover when the folding roof is in said closed position;

at least one collecting trough, which is part of a sealing system of the roof pillars or a part of a rear roof portion that lies laterally outward of the rear window, and into which the water-guiding channel opens in an area adjacent each said roof pillar; and a flexible hose connecting the collecting trough to a moisture space of a vehicle side window.

8. Top apparatus for a hard-top vehicle, comprising:

a movable hard top;

a rear window;

pivotable roof pillars situated laterally adjacent said rear window, said hard top and said rear window being movable between a closed position and a storage position by a pivoting of said roof pillars;

a seal provided at a bottom edge of the rear window, said seal extending underneath a luggage compartment cover of the vehicle when the hard top is in the closed position;

an elongated a water-guiding channel formed in the seal and extending laterally beneath the luggage compartment cover when the hard top is in said closed position;

at least one collecting trough which is part of a sealing system of the roof pillars or a part of a rear roof portion that lies laterally outward of the rear window, and into which the water-guiding channel opens in an area adjacent each said roof pillar; and a flexible hose connecting the collecting trough to a moisture space of a vehicle side window.

* * * * *